United States Patent [19]

Lin

[11] Patent Number: 4,936,202

[45] Date of Patent: Jun. 26, 1990

[54] DRIP-PAN APPARATUS OF VARIABLE LENGTH AND WIDTH

[76] Inventor: Paul Lin, No. 293-8, Pei-Tun Rd., Taichung City, Taiwan

[21] Appl. No.: 362,347

[22] Filed: Jun. 6, 1989

[51] Int. Cl.⁵ .............................................. A47J 27/00
[52] U.S. Cl. ........................................ 99/446; 99/425; 99/444
[58] Field of Search ................. 99/375, 425, 444, 446, 99/400, 408, 445; 126/51

[56] References Cited

U.S. PATENT DOCUMENTS

| | | | |
|---|---|---|---|
| 842,695 | 1/1907 | Peters | 99/446 |
| 3,256,806 | 6/1966 | Jordan | 99/444 |
| 4,119,021 | 10/1978 | Moses | 99/425 |
| 4,178,844 | 12/1979 | Ward et al. | 99/449 |
| 4,574,770 | 3/1986 | Wells | 99/446 |
| 4,598,634 | 7/1986 | Van Horn | 99/446 |

FOREIGN PATENT DOCUMENTS

| | | | |
|---|---|---|---|
| 99551 | 2/1984 | European Pat. Off. | 99/425 |
| 1019153 | 11/1957 | Fed. Rep. of Germany | 99/446 |
| 760993 | 3/1934 | France | 99/446 |

*Primary Examiner*—Harvey C. Hornsby
*Assistant Examiner*—M. Spisich
*Attorney, Agent, or Firm*—Oblon, Spivak, McClelland, Maier & Neustadt

[57] ABSTRACT

A drip-pan apparatus is used to collect meat drippings from meats placed on a grill positioned above the apparatus. The apparatus has several inclined channel members each of which includes a lower section of a wide, U-shaped cross-section, and an upper section of a narrow, U-shaped cross-section placed within the upper end of the lower section at the lower end thereof. Each of the lower and upper sections has several positioning holes formed along the length thereof. A pin is inserted through selected positioning holes of the lower and upper sections. The side walls of the lower ends of the lower sections have oval holes which are positioned in a line. A lower coupling rod is inserted through all of the oval holes of the lower sections and has several cavities formed along the length thereof which are engaged with the side walls of the lower sections. The lower coupling rod may be rotated relative to the lower sections so as to disengage the side walls of the lower sections from the cavities, thereby disconnecting the lower coupling rod from the lower sections. The upper ends of the upper sections are interconnected by an upper coupling rod in the same manner as that of the lower sections. A collecting trough is attached to the lower coupling rod and has an open end positioned immediately under all of the lower ends of the lower sections.

5 Claims, 2 Drawing Sheets

DRIP-PAN APPARATUS OF VARIABLE LENGTH AND WIDTH

BACKGROUND OF THE INVENTION

This invention relates to a drip-pan apparatus, more particularly to a drip-pan apparatus the length and width of which can be varied.

When meats are placed on a porous metal plate, or a metal net, which is supported immediately over a fire, drippings often fall from the meats, thus causing flare-ups of the fire therebelow. Whether the fire is from a gas burner, lava rocks, or charcoal, some of the meats are easily scorched under such circumstances. To overcome this drawback, a drip-pan apparatus is usually placed below the metal plate or net and above the fire so as to collect the greater portion of the meat drippings. The length and width of a conventional drip-pan apparatus, however, are fixed and cannot meet the need of the users when the quantity of the meats broiled is increased or decreased. In particular, drip-pan apparatus of different sizes are required to associate with various gas burners.

SUMMARY OF THE INVENTION

It is therefore the main object of this invention to provide a drip-pan apparatus the length and width of which can be adjusted.

According to this invention, a drip-pan apparatus is used to collect meat drippings from meats placed on a grill positioned above the apparatus. The apparatus has several inclined channel members each of which includes a lower section of a wide, U-shaped cross-section, and an upper section of a narrow, U-shaped cross-section placed within the upper end of the lower section at the lower end thereof. Each of the lower and upper sections has several positioning holes formed along the length thereof. A pin is inserted through selected positioning holes of the lower and upper sections so that the length of the channel members can be varied. The side walls of the lower ends of the lower sections have oval holes which are positioned in a line. A lower coupling rod is inserted through all of the oval holes of the lower sections and has several cavities formed along the length thereof which are engaged with the side walls of the lower sections. The lower coupling rod may be rotated relative to the lower sections so as to disengage the side walls of the lower sections from the cavities, thereby disconnecting the lower coupling rod from the lower sections. The upper ends of the upper sections are detachably interconnected by an upper coupling rod in the same manner as that of the lower sections. A collecting trough is attached to the lower coupling rod and has an open upper end immediately under all of the lower ends of the lower sections. If desired, the user can change the number of the interconnected channel members and hence the width of the apparatus.

BRIEF DESCRIPTION OF THE DRAWINGS

Other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
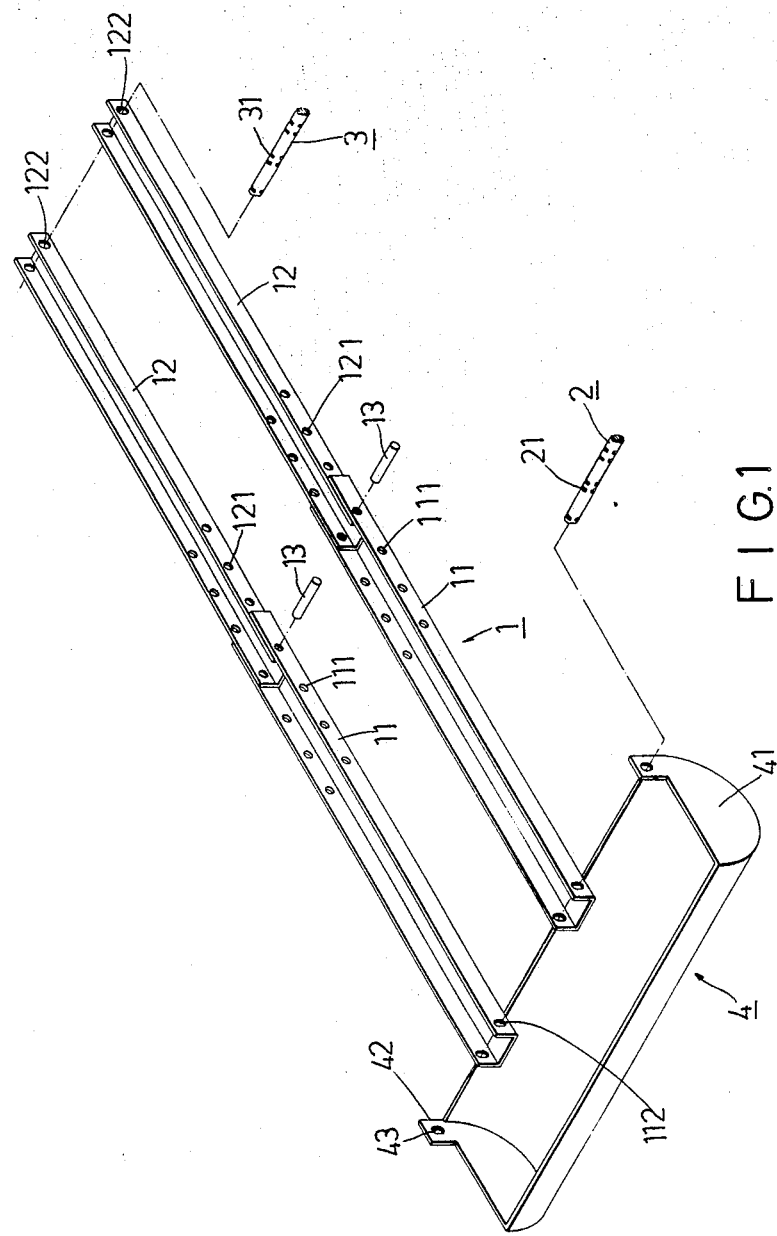
FIG. 1 is a partially exploded view of a drip-pan apparatus according to this invention.
Figure 2:
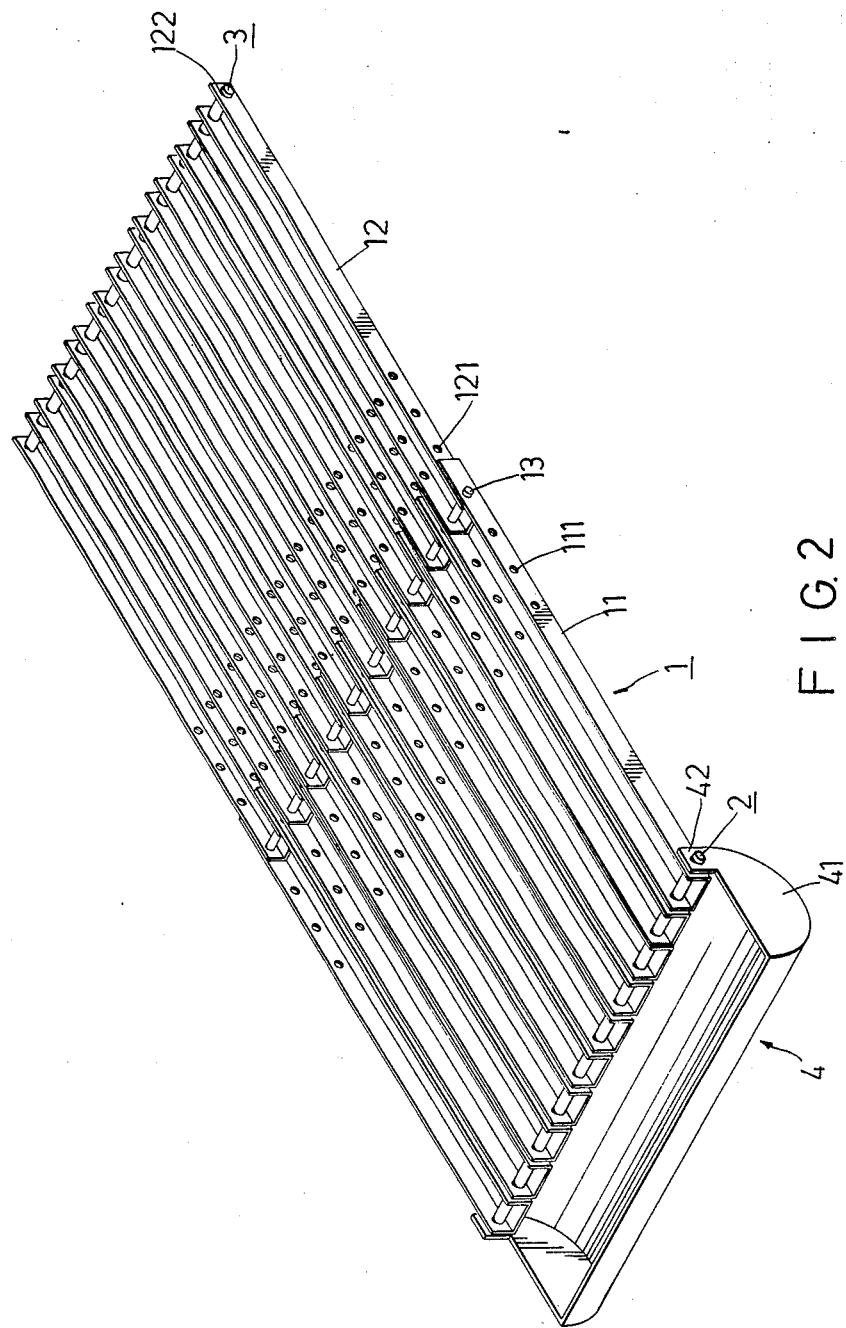
FIG. 2 is an assembled view showing the drip-pan apparatus of this invention.

Referring to FIGS. 1 and 2, a drip-pan apparatus of this invention is normally supported in an inclined position and includes a plurality of parallel channel members 1 (only two are shown in FIG. 1 for clear illustration), a lower coupling rod 2, an upper coupling rod 3 and a semi-cylindrical collecting trough 4. Each of the channel members 1 includes a lower section 11 of a wide, U-shaped cross-section with several pairs of aligned positioning holes 111 formed through the side walls thereof, an upper section 12 of a narrow, U-shaped cross-section with several pairs of aligned positioning holes 121 formed through the side walls thereof, and a pin 13 inserted through selected holes 111, 121 of the lower sections 11 and the upper sections 12. The lower section 11 and the upper section 12 of each channel member 1 have side walls of the same height and bottom walls of different widths. The lower ends of the lower sections 11 have in-line oval holes 112 formed through the side walls thereof so that the lower coupling rod 2 may be inserted therethrough. The lower sections 11 are moved on the lower coupling rod 2 until they align the cavities 21 of the lower coupling rod 2 with the side walls thereof. The lower coupling rod 2 is then rotated relative to the lower sections 11 so as to engage the side walls of the lower sections 11 with the cavities 21, thereby locking the lower sections 11 releasably on the lower coupling rod 2.

Similarly, the upper ends of the upper sections 12 have in-line oval holes 122 and the upper coupling rod 3 has cavities 31 so as to detachably interconnect the upper sections 12 in the same manner as that of the lower sections 11. As a result, the channel members 1 are interconnected in a plane. The trough 4 has two vertical end walls 41 each of which includes a vertical lug 42 provided on the upper end thereof. The lugs 42 also have aligned oval holes 43 so as to couple with the lower coupling rod 2 in the same manner as that of the lower sections 11.

In this embodiment, the apparatus is made of metal and used to receive meat drippings when broiling meats. It can be appreciated that the pins 13 can be moved from one set of positioning holes 111, 121 to another set of positioning holes and additional similar channel members can be coupled with both the lower coupling rod 2 and the upper coupling rod 3 so that the length and width of the channel members 1 can be varied in accordance with the quantity of the meats to be toasted. The channel members 1 are maintained in an intimately spaced-apart relation so as to effectively collect meat drippings.

With this invention thus explained, it is apparent that numerous modifications and variations can be made without departing from the scope and spirit of this invention. It is therefore intended that this invention be limited only as indicated in the appended claims.

I claim:

1. A drip-pan apparatus for collecting meat drippings comprising:

a plurality of channel members each including a first section of a wide, U-shaped cross-section having a first end and a second end, a second section of a narrow, U-shaped cross-section having a first end and a second end placed within said second end of said first section, and a locking means interconnecting said first and second sections, each of said first and second sections having a plurality of positioning means provided along length thereof, said locking means interlocking releasably a selected one of said positioning means of said first section and a selected one of said positioning means of said second section so that length of said channel members can be varied;

a first coupling element interconnecting removably said first ends of said first sections;

a second coupling element interconnecting removably said first ends of said second sections so as to position all of said channel members in a plane; and a collecting trough attached to said first coupling element and having an open upper end positioned immediately under all of said first ends of said first sections;

whereby, when said first ends of said second sections are positioned at a level above that of said first ends of said first sections, a liquid formed from said meat drippings flows along passages defined by said channel members into said trough.

2. A drip-pan apparatus as claimed in claim 1, wherein each of said first and second sections has two vertical side walls and a bottom wall interconnecting said side walls, each of said positioning means being a pair of aligned positioning holes formed through said side walls of each of said first and second sections, said locking means of each of said channel members being a pin inserted through one pair of said aligned positioning holes of said first section of said channel member and one pair of said aligned positioning holes of said second section of said channel member.

3. A drip-pan apparatus as claimed in claim 1, wherein each of said second sections has two vertical side walls and a bottom wall interconnecting said side walls, said side walls of said first ends of said second sections having oval holes which are positioned in a line, said second coupling element being a rod inserted through all of said oval holes of said second sections and having a plurality of cavities formed along length thereof which are engaged with said side walls of said second sections, whereby, said rod may be rotated relative to said second sections so as to disengage said side walls of said second sections from said cavities of said rod, thereby disconnecting said rod from said second sections.

4. A drip-pan apparatus as claimed in claim 1, wherein each of said first sections has two vertical side walls and a bottom wall interconnecting said side walls, said side walls of said first ends of said first sections having oval holes which are positioned in a line, said first coupling element being a rod inserted through said oval holes of said first sections and having a plurality of cavities formed along length thereof which are engaged with said side walls of said first sections, whereby, said rod may be rotated relative to said first sections so as to disengage said side walls of said first sections from said cavities of said rod, thereby disconnecting said rod from said first sections.

5. A drip-pan apparatus as claimed in claim 1, wherein said trough has two vertical end walls each of which includes a vertical lug fixed on an upper end thereof, each of said lugs having an oval hole formed therethrough, said first coupling element being a rod having two cavities formed along length thereof, said rod being inserted through said oval holes of said lugs in such a manner that said lugs are partially engaged with said cavities of said rod so as to fix said rod on said trough, whereby, said rod may be rotated relative to said trough so as to disengage said lugs of said trough from said cavities of said rod, thereby disconnecting said rod from said trough.

* * * * *